United States Patent
Beatt et al.

(10) Patent No.: US 8,974,664 B2
(45) Date of Patent: Mar. 10, 2015

(54) STORM WATER TREATMENT SYSTEM

(75) Inventors: Grant Stuart Beatt, Sarasota, FL (US); Bradley David Main, Nokomis, FL (US)

(73) Assignee: Ceres H2O Technologies, LLC, Sarasota, FL (US)

(*) Notice: Subject to any disclaimer, the term of this patent is extended or adjusted under 35 U.S.C. 154(b) by 427 days.

(21) Appl. No.: 13/356,793

(22) Filed: Jan. 24, 2012

(65) Prior Publication Data
US 2012/0187031 A1    Jul. 26, 2012

Related U.S. Application Data

(60) Provisional application No. 61/435,461, filed on Jan. 24, 2011.

(51) Int. Cl.
| | | |
|---|---|---|
| *C02F 3/30* | (2006.01) | |
| *E03F 1/00* | (2006.01) | |
| *E03F 5/10* | (2006.01) | |
| *C02F 3/04* | (2006.01) | |
| *C02F 3/32* | (2006.01) | |
| *C02F 3/34* | (2006.01) | |
| *C02F 103/00* | (2006.01) | |

(52) U.S. Cl.
CPC .............. *E03F 1/002* (2013.01); *E03F 5/103* (2013.01); *C02F 3/046* (2013.01); *C02F 3/32* (2013.01); *C02F 3/341* (2013.01); *C02F 3/347* (2013.01); *C02F 2103/001* (2013.01)
USPC ...................... 210/150; 210/170.03; 210/602

(58) Field of Classification Search
CPC ............ C02F 3/046; C02F 3/32; C02F 3/327; C02F 3/30; C02F 3/2806; E03F 1/002; E03F 5/10; E03F 5/103
USPC .......... 210/150, 151, 170.01, 170.03, 170.08, 210/602, 747.2, 747.3
See application file for complete search history.

(56) References Cited

U.S. PATENT DOCUMENTS

| | | | | |
|---|---|---|---|---|
| 4,810,385 | A | * | 3/1989 | Hater et al. .................... 210/150 |
| 4,824,572 | A | * | 4/1989 | Scott ........................ 210/170.08 |
| 5,342,144 | A | | 8/1994 | McCarthy |
| 5,622,448 | A | | 4/1997 | Baum et al. |
| 5,921,709 | A | | 7/1999 | Baum et al. |
| 6,540,910 | B2 | * | 4/2003 | Schwarzenegger et al. .. 210/151 |
| 6,905,599 | B2 | * | 6/2005 | Allard ...................... 210/170.03 |
| 7,025,076 | B2 | | 4/2006 | Zimmerman, Jr. et al. |
| 7,029,201 | B1 | | 4/2006 | McCormick et al. |
| 7,425,262 | B1 | | 9/2008 | Kent |
| 7,510,649 | B1 | * | 3/2009 | Lavigne ................... 210/170.08 |
| 2001/0045383 | A1 | | 11/2001 | Coffman |
| 2006/0210358 | A1 | | 9/2006 | Chen |
| 2009/0261026 | A1 | * | 10/2009 | Grewal et al. ................. 210/150 |
| 2009/0261036 | A1 | * | 10/2009 | Lucas ............................ 210/602 |
| 2010/0059438 | A1 | * | 3/2010 | Bottcher ....................... 210/150 |
| 2010/0200480 | A1 | * | 8/2010 | Kania et al. .............. 210/170.03 |

FOREIGN PATENT DOCUMENTS

| | | |
|---|---|---|
| JP | 04092036 A | 3/1992 |
| KR | 10-0533326 B1 | 12/2005 |
| KR | 10-2006-020780 A | 3/2006 |

* cited by examiner

*Primary Examiner* — Christopher Upton
(74) *Attorney, Agent, or Firm* — Gifford, Krass, Sprinkle, Anderson & Citkowski, P.C.

(57) ABSTRACT

A procedure for treating rain water run-off includes forming a swale for the capture, treatment, and re-use of the storm water to improve the overall quality of the water before discharge.

9 Claims, 3 Drawing Sheets

US 8,974,664 B2

STORM WATER TREATMENT SYSTEM

CROSS-REFERENCE TO RELATED APPLICATIONS

This Application claims the benefit of U.S. Provisional Application 61/435,461 filed on Jan. 24, 2011, which is incorporated herein by reference.

FIELD OF THE INVENTION

The present invention relates to the treatment of storm water and more particularly to a method which includes forming a swale for the capture, treatment, and re-use of run-off storm water in order to improve the overall quality of the water before discharge.

BACKGROUND OF THE INVENTION

Bio-retention is a process by which storm water is captured, often in an artificially created swale and then is treated to remove contaminants before returning the water to the ecosystem. Such systems have heretofore included collecting storm water in a retention area consisting of a shallow depression with a gravel interface and vegetated with plants or grasses. The storm water is filtered as it passes through the ground cover and the soil or is evaporated to remove the contaminants before the water is permitted to reach underground water returns for returning the water to above ground storage areas.

SUMMARY OF THE INVENTION

The present invention is directed to a bio-retention swale which includes additional features to enhance treatment of storm water run-off. Unlike standard bio-retention swales the system of the present invention has the ability to provide bio-augmentation and bio-stimulation before returning the water to be used or stored for later use. The system of the present invention is able to inoculate the bio-retention swale on a regular basis. Depending on the type and volume of the pollutants and heavy metals moving into the swale, specific bacterial inoculation can be positioned strategically to treat and degrade or convert these compounds. The swale of the present system is able to harvest and store storm water. The treated run-off water irrigates the native vegetation in the bio-retention swale. Seepage irrigation also allows for regular inoculation of native vegetation root system and surrounding engineered soil materials.

BRIEF DESCRIPTION OF THE DRAWINGS

The system of the present invention is illustrated in the attached drawings in which.

DETAILED DESCRIPTION OF THE PREFERRED EMBODIMENTS OF THE PRESENT INVENTION

Figure 1:
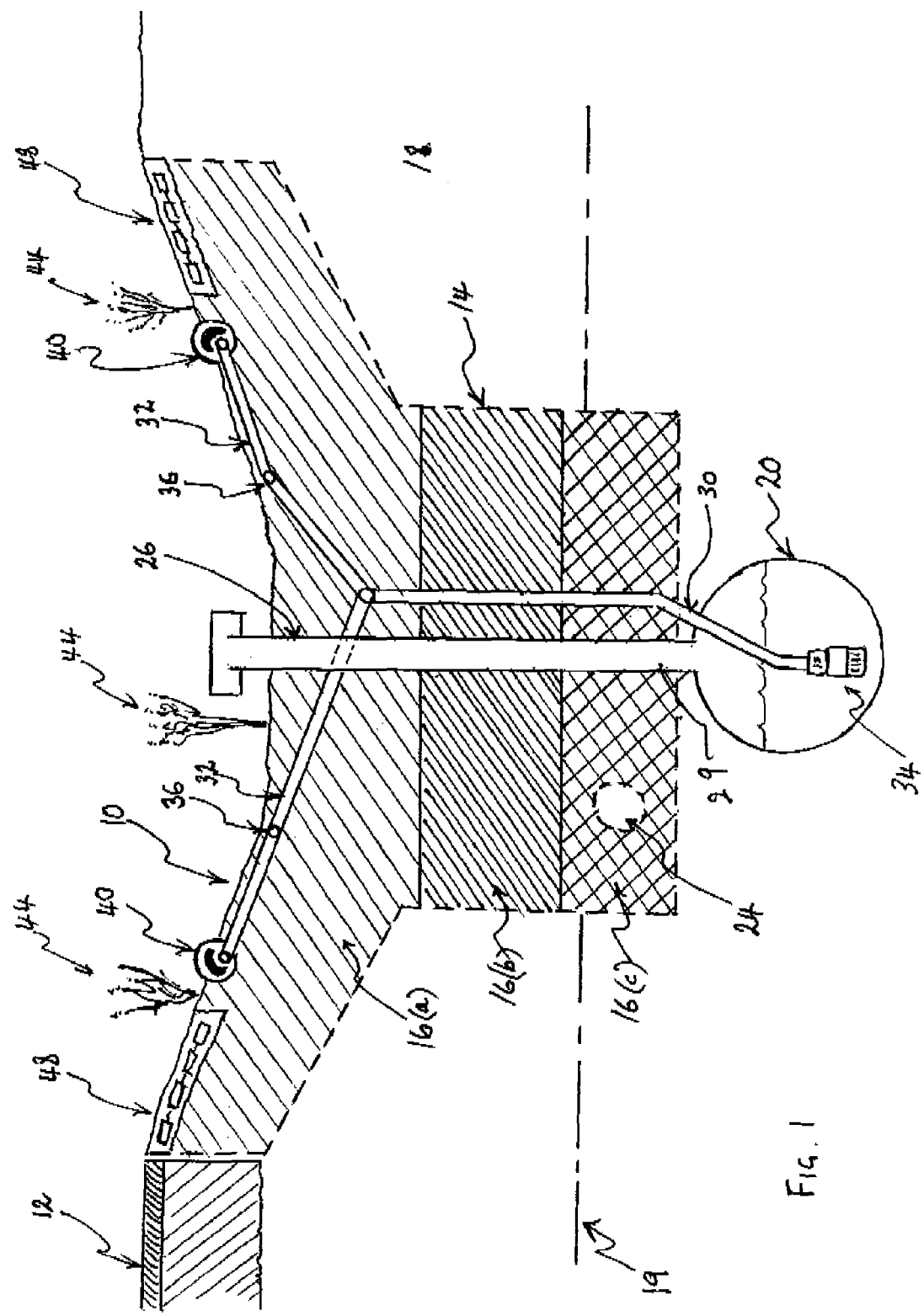
FIG. 1 is a diagrammatic view illustrating the bio-retention swale of the present invention.

FIG. 1 illustrates the following components of the system of the present invention:

A swale 10 is preferably formed to receive storm water run-off and for that reason the swale 10 is preferably located adjacent a paved parking area 12, or the like, where run-off is likely.

An impervious or semi-permeable liner 14 is installed between the parent subsoil 18 and a multilayered profile of engineered materials 16 including engineered planting soil material 16a, an anaerobic material 16b, and a drain field 16c. The liner 14 may not be required if the groundwater table 19 is deep enough. The liner 14 is provided to provide a barrier between the bottom of the swale 10 and groundwater 19.

A storage vessel 20 is placed longitudinally in the swale 10 either within the liner 14 or in the parent subsoil 18. A perforated tubular structural drain 24 is placed longitudinally in the lower portion of the swale 10 within the liner 14 to collect and drain treated water as will become more apparent as the description proceeds.

Vertical collection drains 26 are placed at strategic positions within the basin of the swale 10 and are fitted with a combination of baffles, mesh screens, debris diverters and/or hydrodynamic separators (not shown).

A porous pavement material and/or stabilized aggregate 48 which may be surface or subsurface, depending on the site, is provided along the edges of the swale 10. This aggregate 48, or the like, is used to stabilize the edge of the swale 10 especially adjacent to roadways or parking lots 12 which may have traffic intrusion and for parking of maintenance vehicles. This aggregate 48 verge also allows rainwater to start infiltrating into the swale 10.

As shown in FIG. 1, a variety of selected woody ornamentals, grasses, herbaceous perennials and annuals 44 are planted within the swale 10 in specific locations.

Also as shown in FIG. 1, the storage vessel 20 is fitted directly or indirectly to a pump 34 which can pump this stored water through a main line 30 and lateral lines 32 to subsurface seep tubes 36 which run laterally below the surface of the swale 10. As shown in FIG. 1, there is a slotted inoculation tube 40 that runs laterally down one or both sides of the surface of the swale 10. This inoculation tube 40, shown in more detail in FIG. 2, contains a seepage tube 36 and an inoculation sock or teabag style container 45 containing inoculation material 47. The inoculation sock 45 sits on top of the seepage tube 36 and is contained and protected by the inoculation tube 40. The inoculation material 47 is disposed within the sock 45.

Figure 2:
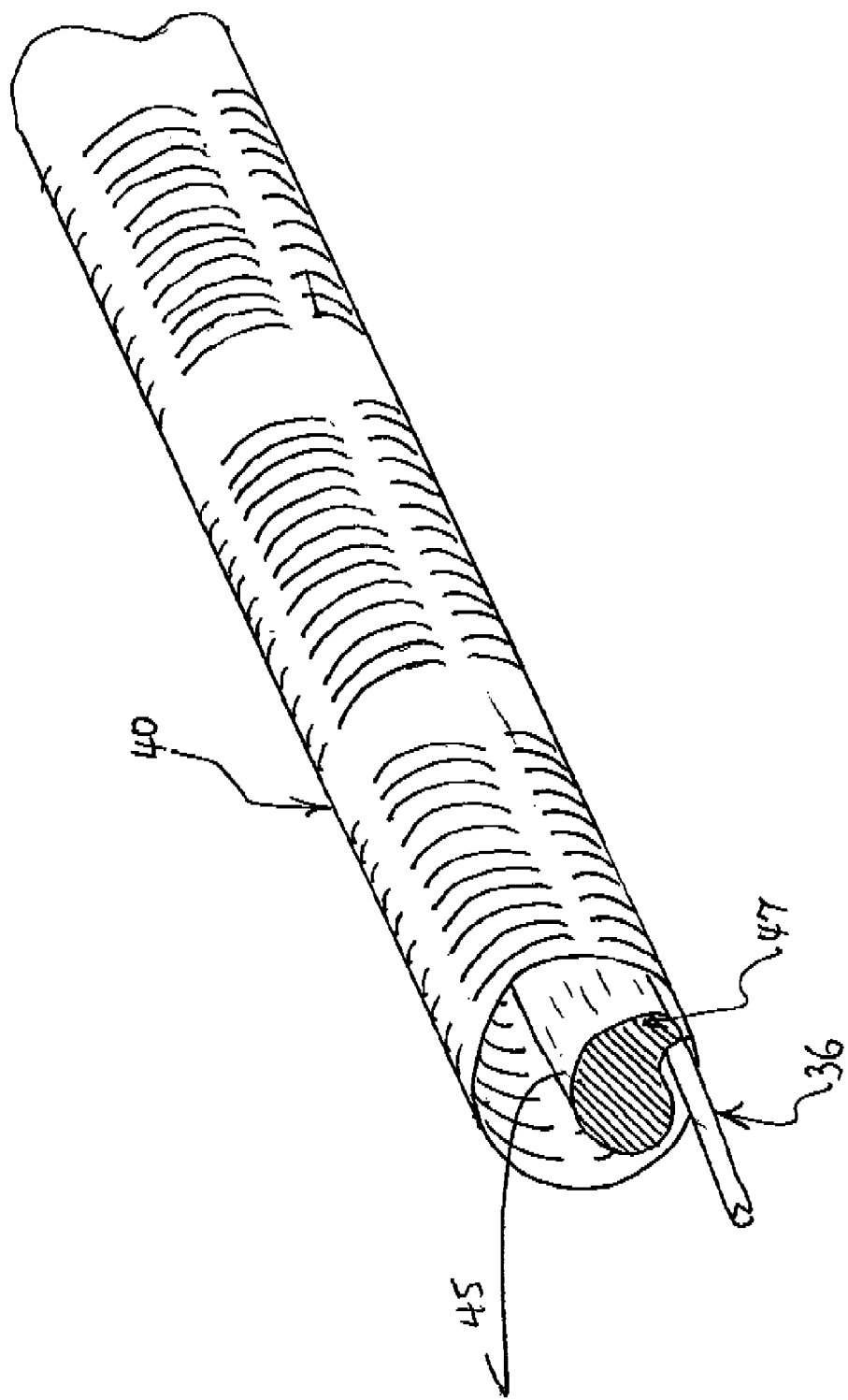
FIG. 2 is a fragmentary diagrammatic view of structure shown in FIG. 1.

Monitoring or sampling stations (not shown) are preferably placed in strategic locations within the swale 10 and an alternative water source (not shown) may be connected to the storage vessel 20 or to the wet well sump tube 133, FIG. 2, to provide a water source other than storm water in the system.

The function, purpose and integration of the components listed above are as follows:

The liner 14 is included to exclude groundwater 19 from entering the engineered profile 16 (a, b, c) of the swale 10. The collection drains 26 are to capture excess storm water and store it in the storage vessel 20 so that it can be reused to irrigate the swale 10, to re-inoculate the swale 10 through the inoculation tube 40 and to maintain hydration of the swale 10 to optimize the effectiveness of the bioremediation and phytoremediation processes through the plants 44. The engineered profile 16, consisting of the engineered planting soil layer 16a, the anaerobic layer 16b and the drain field 16c, is to assist the bioremediation and phytoremediation processes that are taking place as the water infiltrates down through the engineered profile 16.

The anaerobic layer 16b functions best when wet and to keep it wet during periods when there is not sufficient rainwater percolating through the engineered profile 16 the drain 50 (FIG. 3) can be used to direct water through the conduit 24 to the layer 166.

The engineered planting soil layer 16a is typically classified as a sandy loam texture with a cation exchange capacity of ±10. This soil is engineered to promote hydraulic conductivity and enhance plant and root growth of the plants 44 in the swale 10. Such materials are commonly available for this purpose.

The pump 34, irrigation main lines 30, irrigation lateral lines 32 and seepage tubes 36 are to effectively redistribute and recycle the captured rainwater to provide even distribution of irrigation water back into the swale 10 and to re-inoculate the rainwater through the seepage tube 36 placed in the inoculation tube 40 under and in contact with the inoculation material 47.

The inoculation material 47 is a consortium of bacterial spores and fungi designed to treat and remove contaminants commonly found in storm water runoff. Such material found to be useful for the intended purpose is presently being sold as thixotropic inoculant and is available from Pathway Bio-Logic, LLC of Plant City, Fla.

The perforated collection drains 24 in the drain field 16c collect the treated water after it has gravitated through the profile 16a and 16b and direct it to a point of discharge from the swale 10.

The slotted inoculation tube 40 has the following functions:
(a) point of source inoculation of the storm water as it enters the swale 10;
(b) distribution of the storm water and seepage irrigation water as it enters or reenters the swale;
(c) create contact between the storm water or irrigation water and the inoculation material 47 and even distribution of the water back into the swale; and
(d) protection of, and maintenance access to, the irrigation seepage tubes 36 and inoculation material 47.

Common irrigation valves and irrigation controllers (not shown) are used to automatically control the irrigation timing to the swale 10. These can be connected to soil moisture sensors (not shown) placed in the swale 10 and be integrated with ET based controllers (not shown) to make sure the treated water is reused as efficiently as possible.

The plants 44 are preferably a variety of selected plants for the purpose of soil stabilization, laminar flow, flow control of storm and irrigation water, phytoremediation, bioremediation and filtration.

The inoculant material 47 provides inoculation of the storm and irrigation water for the initiation and augmentation of the bioremediation and phytoremediation processes to clean and improve the water quality passing through the swale profile.

The porous pavement and/or aggregate material 48 provided along the edges of the swale are to provide a stable surface for high traffic situations, maintenance vehicles and to slow down and allow infiltration on the verge of the swale.

Figure 3:
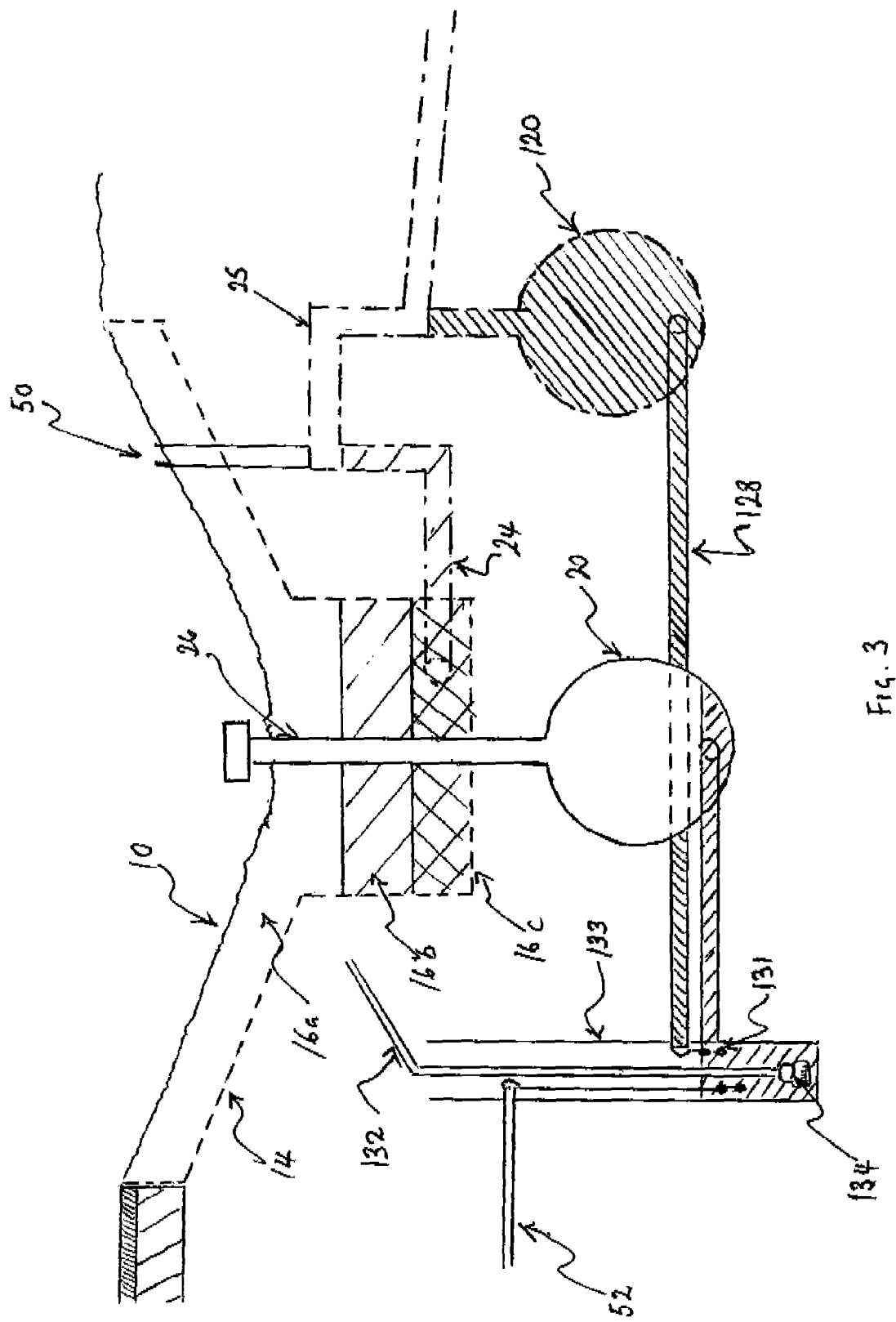
FIG. 3 is a diagrammatic view of a modification of the bio-retention swale shown in FIG. 1.

Alternative water sources 52, FIG. 3, are plumbed into the system to provide water in the event of a long dry spell with little or no rain when the captured water in the storage vessel 20 is depleted.

The location, inclusion and number of components described above are dependent on the size of the swale 10.

In operation, rainwater, especially if flowing into the swale 10 from pavement or the impervious area 12 or like, can contain oil, gasoline and various other contaminants that can pollute groundwater and other waterways. With the system of the present invention the rainwater is captured, stored, and reused allowing maximum exposure of the polluted water to bioremediation and phytoremediation processes through irrigation.

During a light rain event the rainwater from the pavement 12 or the like flows into the swale 10 over the stabilized aggregate layer 48 before it enters the swale 10.

The porous pavement material and/or stabilized aggregate layer 48 provided along the edges of the swale 10 are to allow for traffic intrusion and maintenance vehicles to enter the verge of the swale 10. This verge also allows rainwater to infiltrate into the swale 10.

The rainwater entering the swale 10, once it has passed over the aggregate layer 48, will be further slowed down and laterally distributed by strategic plants and grasses 44 planted along the edge of the aggregate layer 48.

The rainwater, once it has been slowed down, then passes into and over the slotted pipe inoculation tube 40. This inoculated water then, during a light rainfall event, will seep through the engineered profile 16 which consists of the engineered planting soil 16a, the anaerobic layer 16b and into the drain field 16c.

The rainwater, which has collected in the drain field 16c, will then be collected in a tubular perforated structural drain pipe 24 which discharges the cleaned water out of the swale system. This water can discharge out to a receiving water body or drain system or it can be captured for reuse as is described in the modification disclosed in FIG. 3.

During a heavier rain event, the rainwater flowing into the swale 10 may exceed the infiltration rate of the engineered profile 16 described above (16a, 16b, 16c). This rainwater will then, once it has ponded high enough, be collected in the vertical collection drains 26 and conduit 29 to be stored in the storage vessel 20.

The excess storm water captured in the storage vessel 20 can be reused to irrigate the swale 10 and plants 44 by actuating the pump 34 which sends water through the irrigation main lines 30, irrigation laterals 32 and through the seepage tubes 36 to irrigate the swale 10. Any excess reused storm water will again infiltrate through the engineered profile 16 and be collected for discharge through drain pipe 24.

In an extreme rain event where the storage vessel 20 is now full then a normal outlet weir structure (not shown) at the discharge end of the swale 10 will allow this water to discharge from the swale 10 to the downstream storm water infrastructure.

FIG. 3 discloses a modification to the system to allow the harvesting and storage of storm water passing through the swale 10 when the storm event has not been big enough to allow any capture in the storage vessel 20.

For this purpose a second or auxiliary storage vessel 120 is provided and is connected to an outlet pipe 25. At a time when storage vessel 20 is depleted, water from the auxiliary storage vessel 120 is supplied via conduit 128 and float valve 131 to a wet well sump 133. A pump 134 then supplies the swale irrigation system through a modified main line 132 to irrigate the swale as described previously.

It should be apparent that the present invention is directed to a system for treating storm water runoff and permit it to be reused or discharged without any environmental harm.

Although the system has been described with respect to the use of various components, it should also be apparent that variations with regard to the components can be made without departing from the spirit of the invention as expressed by the following claims.

The invention claimed is:

1. A run-off rain-water treatment system comprising:
a swale for capturing and retaining the rain water,
a liner disposed below the surface of said swale and spaced from said swale;
a layer of treated soil below the surface said swale and above said liner;
a layer of anaerobic material disposed below said treated soil and above said liner;
an outlet drain disposed below said treated soil and at least a portion of the anaerobic material for collecting water that has percolated through the treated soil and the anaerobic material;
a storage vessel disposed below the surface of the swale;
drain tubes disposed in the bottom of said swale for collecting run-off rainwater entering said swale;
irrigation seep lines disposed below the surface of said swale for irrigating the surface of said swale and connected with said drain tubes to said storage vessel;
a pump for pumping water from the storage vessel to said irrigation seep pipes to provide seep water to the surface of said swale.

2. The invention as defined in claim 1 and including;
a collection conduit extending into and below the swale, said conduit having an opening above the swale;
said conduit being connected to said storage vessel.

3. The invention as defined in claim 1 and including a drain provided within but above the ground level of said swale for draining said swale when the run-off rain water in said swale reaches a predetermined level and said drain being connected directly to said storage vessel.

4. The invention as defined in claim 1 and including inoculation material disposed within said drain tubes for treating the rain water prior to the rainwater entering said seep lines.

5. The invention as defined in claim 1 and including a collection drain provided within said swale to receive water entering said swale for draining said swale when the run-off rain water in said swale reaches a predetermined level and said collection drain being connected directly to said storage vessel.

6. The invention as defined in claim 1 and including a sock disposed within said drain tube and inoculation material disposed within said sock.

7. A run-off rain-water treatment system comprising:
a swale for capturing and retaining the rain water,
a liner disposed below the surface of said swale and spaced from said swale;
a layer of treated soil below the surface of said swale and above said liner;
a layer of anaerobic material disposed below said treated soil and above said liner; and
an outlet drain disposed below treated soil and at least a portion of the anaerobic material for collecting water that has percolated through the treated soil and the anaerobic material;
a seepage irrigation line disposed below but adjacent the surface of said swale and a storage vessel disposed below said seepage line and connected to said seepage irrigation line;
drain tubes disposed below the surface said swale and connected to said seepage line whereby rainwater in said swale is directed by said drain tubes to said seepage line and to said storage vessel; and
a pump connected to the rain water in said storage vessel for pumping the collected rain water to the seepage irrigation line for irrigation of said swale.

8. A run-off rain-water treatment system comprising:
a swale for capturing and retaining the rain water,
a liner disposed below the surface of and spaced from said swale;
a layer of treated soil below the surface of said swale and above said liner;
a layer of anaerobic material disposed below said treated soil and above said liner;
an outlet drain disposed below treated soil and at least a portion of the anaerobic material for collecting water that has percolated through the treated soil and the anaerobic material;
a storage vessel disposed below the surface of said swale for collecting and storing rainwater;
a conduit connecting said outlet drain for conducting the treated water away from said swale and a second storage vessel disposed above said first mentioned storage vessel for storing treated water; and
said second storage vessel being selectively connected to said first mentioned storage vessel to add treated water to the untreated water in said first mentioned storage vessel to permit the use of the treated rain water to be used to irrigate the swale.

9. A run-off rain-water treatment system comprising:
a swale for capturing and retaining the rain water,
a liner disposed below the surface of said swale and spaced from said swale;
a layer of treated soil below the surface said swale and above said liner;
an outlet drain disposed below said treated soil for collecting water that has percolated through the treated soil;
a storage vessel disposed below the surface of the swale;
drain tubes disposed in the bottom of said swale for collecting run-off rainwater entering said swale;
irrigation seep lines disposed below the surface of said swale for irrigating the surface of said swale and connected with said drain tubes to said storage vessel;
a pump for pumping water from the storage vessel to said irrigation seep pipes to provide seep water to the surface of said swale.

* * * * *